United States Patent
Akkarakaran et al.

(10) Patent No.: US 11,979,478 B2
(45) Date of Patent: May 7, 2024

(54) SIGNALING FOR RELAYING PRIOR TO DECODING

(71) Applicant: QUALCOMM Incorporated, San Diego, CA (US)

(72) Inventors: Sony Akkarakaran, Poway, CA (US); Tao Luo, San Diego, CA (US); Junyi Li, Fairless Hills, PA (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/322,846

(22) Filed: May 17, 2021

(65) Prior Publication Data

US 2021/0368027 A1 Nov. 25, 2021

Related U.S. Application Data

(60) Provisional application No. 63/027,212, filed on May 19, 2020.

(51) Int. Cl.
*H04B 7/14* (2006.01)
*H04L 69/06* (2022.01)

(52) U.S. Cl.
CPC ............. *H04L 69/06* (2013.01); *H04B 7/14* (2013.01)

(58) Field of Classification Search
CPC ............. H04B 7/14–15592; H04L 69/00–06
See application file for complete search history.

(56) References Cited

U.S. PATENT DOCUMENTS

| | | | | |
|---|---|---|---|---|
| 6,128,687 A | * | 10/2000 | Dao | G06F 11/0763 714/21 |
| 2008/0305740 A1 | * | 12/2008 | Horiuchi | H04B 7/155 455/7 |
| 2009/0119485 A1 | * | 5/2009 | Smith | G06F 9/3816 712/205 |
| 2011/0099446 A1 | * | 4/2011 | Murakami | H04L 1/1887 714/E11.131 |
| 2012/0140796 A1 | * | 6/2012 | Dai | H04L 1/0077 375/213 |
| 2013/0336202 A1 | | 12/2013 | Oh et al. | |

(Continued)

FOREIGN PATENT DOCUMENTS

EP 1324509 A2 7/2003

OTHER PUBLICATIONS

International Search Report and Written Opinion—PCT/US2021/032974—ISA/EPO—dated Sep. 3, 2021.

*Primary Examiner* — Michael Thier
*Assistant Examiner* — Prince A Mensah
(74) *Attorney, Agent, or Firm* — Arun Swain

(57) ABSTRACT

Certain aspects of the present disclosure provide techniques for signaling that relayed packets include information generated prior to decoding (e.g., pre-decoded samples, such as log-likelihood ratios (LLRs)). A method that may be performed by a first wireless node (e.g., a relay node such as a repeater user equipment (UE), a network entity such as an access point (AP), base station (BS) or next generation NodeB (gNB), or another node) includes determining at least one first packet to be transmitted to a second node includes pre-decoded first information about a second packet and providing an indication to the second node that the first packet includes pre-decoded first information.

28 Claims, 11 Drawing Sheets

(56) References Cited

U.S. PATENT DOCUMENTS

| | | | |
|---|---|---|---|
| 2015/0063207 A1* | 3/2015 | Nakamura | H04L 27/2647 |
| | | | 370/328 |
| 2015/0124694 A1* | 5/2015 | Benammar | H04L 1/065 |
| | | | 370/315 |
| 2015/0201366 A1 | 7/2015 | Lim et al. | |
| 2018/0095752 A1* | 4/2018 | Kudaravalli | G06F 12/0875 |
| 2018/0184359 A1* | 6/2018 | Hessler | H04W 40/22 |
| 2019/0350047 A1* | 11/2019 | Shan | H04W 8/005 |

* cited by examiner

SIGNALING FOR RELAYING PRIOR TO DECODING

CROSS-REFERENCE TO RELATED APPLICATION(S)

This application claims benefit of and priority to U.S. Provisional Application No. 63/027,212 filed May 19, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for signaling that relayed packets include information generated prior to decoding (e.g., pre-decoded samples, such as log-likelihood ratios (LLRs)).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication in integrated access and backhaul systems.

Certain aspects provide a method for wireless communications by a first node (e.g., a wireless relay node). The method generally includes determining at least one first packet to be transmitted to a second node includes pre-decoded first information about a second packet; and providing an indication to the second node that the first packet includes pre-decoded first information.

Certain aspects provide a method for wireless communications by a first node (e.g., a wireless receiver node). The method generally includes decoding at least a first packet from a second node; obtaining an indication that the first packet includes pre-decoded first information about a second packet; and attempting to decode the second packet based on the pre-decoded first information.

Certain aspects can be implemented in an apparatus for wireless communication by a first node (e.g., a wireless relay node). The apparatus may include at least one processor and a memory coupled to the at least one processor, the memory including instructions executable by the at least one processor to cause the apparatus to determine at least one first packet to be transmitted to a second node includes pre-decoded first information about a second packet; and provide an indication to the second node that the first packet includes pre-decoded first information.

Certain aspects can be implemented in an apparatus for wireless communication by a first node (e.g., a wireless receiver node). The apparatus may include at least one processor and a memory coupled to the at least one processor, the memory including instructions executable by the at least one processor to cause the apparatus to decode at least a first packet from a second node; obtain an indication that the first packet includes pre-decoded first information about a second packet; and attempt to decode the second packet based on the pre-decoded first information.

Certain aspects can be implemented in an apparatus for wireless communication by a first node (e.g., a wireless relay node). The apparatus may include means for determining at least one first packet to be transmitted to a second node includes pre-decoded first information about a second packet; and means for providing an indication to the second node that the first packet includes pre-decoded first information.

Certain aspects can be implemented in an apparatus for wireless communication by a first node (e.g., a wireless receiver node). The apparatus may include means for decoding at least a first packet from a second node; means for obtaining an indication that the first packet includes pre-decoded first information about a second packet; and means for attempting to decode the second packet based on the pre-decoded first information.

Certain aspects can be implemented in a non-transitory computer-readable medium for wireless communication by a first node (e.g., wireless relay node). The non-transitory computer-readable medium may comprise computer-executable instructions that, when executed by one or more processors of a processing system, cause the processing system to determine at least one first packet to be transmitted to a second node includes pre-decoded first information about a second packet; and provide an indication to the second node that the first packet includes pre-decoded first information.

Certain aspects can be implemented in a non-transitory computer-readable medium for wireless communication by a first node (e.g., wireless receiver node). The non-transitory computer-readable medium may comprise computer-executable instructions that, when executed by one or more processors of a processing system, cause the processing system to decode at least a first packet from a second node; obtain an indication that the first packet includes pre-decoded first information about a second packet; and attempt to decode the second packet based on the pre-decoded first information.

To the accomplishment of the foregoing and related ends, the one or more aspects including the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
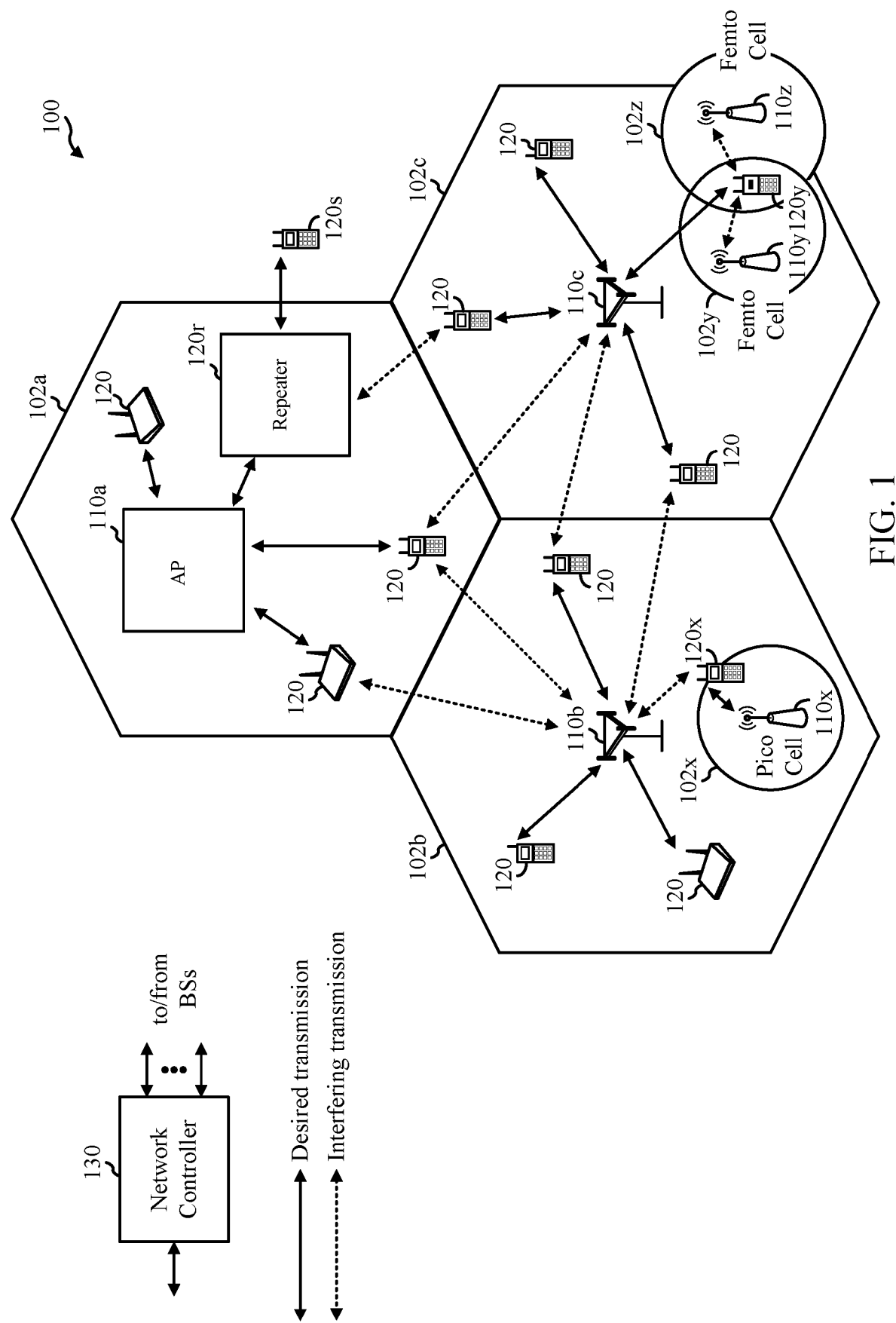
FIG. 1 is a block diagram conceptually illustrating an example wireless communications system, in accordance with certain aspects of the present disclosure.

Aspects of the present disclosure provide apparatus, methods, processing systems, and computer readable mediums to enhance the functionality of relay nodes (wireless devices that relay directional wireless signals). As described in greater detail below, by relaying pre-decoded samples of a packet, processing time may be reduced, and packets may be relayed faster. The techniques presented herein provide mechanisms for signaling that relayed packets include information generated prior to decoding (e.g., pre-decoded samples, such as log-likelihood ratios (LLRs)).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), an integrated access and backhaul (TAB) node (e.g., an IAB donor node, an IAB parent node, and an JAB child node), or some other terminology.

A user equipment (UE) may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem (such as an AR/VR console and headset). Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Example Wireless Communications System

FIG. 1 illustrates an example wireless communication network 100 in which aspects of the present disclosure may be performed. For example, as shown in FIG. 1, a user equipment (UE) 120r may serve as a relay or repeater. Such relays or repeaters and/or a network entity, such as an access point (AP) 110 (e.g., base station (BS) or next generation node) may be configured to perform operations 700 of FIG. 7 to provide an indication that relayed packets include pre-decoded samples of a source packet. In some cases, the pre-decoded samples may be compressed using a compression scheme. The receiver node (e.g., a UE 120 or AP 110) may be configured to perform operations 800 of FIG. 8 to receive and process relayed packets.

The wireless communication network 100 may, for example, be a New Radio (NR) or 5G network. As illustrated in FIG. 1, the wireless communication network 100 may include a number of access points (APs) 110 and other network entities. An AP may be a UE that communicates with user equipment (UEs). Each AP 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR AP, 5G NB, or transmission reception point (TRP) may be interchangeable. In some examples, a cell may not necessarily be stationary, and the geographic area of the cell may move according to the location of a mobile AP. In some examples, the APs may be interconnected to one another and/or to one or more other access points or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

An AP may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). An AP for a macro cell may be referred to as a macro AP. An AP for a pico cell may be referred to as a pico AP. An AP for a femto cell may be referred to as a femto AP or a home AP. In the example shown in FIG. 1, the APs 110a, 110b and 110c may be macro APs for the macro cells 102a, 102b and 102c, respectively. The AP 110x may be a pico AP for a pico cell 102x. The APs 110y and 110z may be femto APs for the femto cells 102y and 102z, respectively. An AP may support one or multiple (e.g., three) cells.

Wireless communication network 100 may also include relay UEs 120r. A relay UE 120r is a UE that receives a transmission of data and/or other information from an upstream UE (e.g., an AP 110 or a UE 120) and sends a transmission of the data and/or other information to a downstream UE (e.g., a UE 120 or an AP 110). A relay UE 120r may also be a UE that relays transmissions for other UEs 120. In the example shown in FIG. 1, a relay UE 120r may communicate with the AP 110a and a UE 120s in order to facilitate communication between the AP 110a and the UE 120s. A relay UE 120r may also be referred to as an integrated access and backhaul (IAB) node, a relay AP, a relay, etc.

Wireless communication network 100 may be a heterogeneous network that includes APs 110 of different types, e.g., macro AP, pico AP, femto AP, relays, etc. These different types of APs 110 may have different transmit power levels, different coverage areas, and different impact on interference in the wireless communication network 100. For example, macro AP may have a high transmit power level (e.g., 20 Watts) whereas pico AP, femto AP, and relays may have a lower transmit power level (e.g., 1 Watt).

Wireless communication network 100 may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for both synchronous and asynchronous operation.

A network controller 130 may couple to a set of APs and provide coordination and control for these APs. The network controller 130 may communicate with the APs 110 via a backhaul. The APs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. As noted above, a UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with an AP 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks (RBs)), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using time division duplexing (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., an AP 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. APs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between a UE 120 and a serving AP 110, which is an AP 110 designated to serve the UE 120 on the DL and/or UL. A finely dashed line with double arrows indicates interfering transmissions between a UE 120 and an AP 110.

Figure 2:
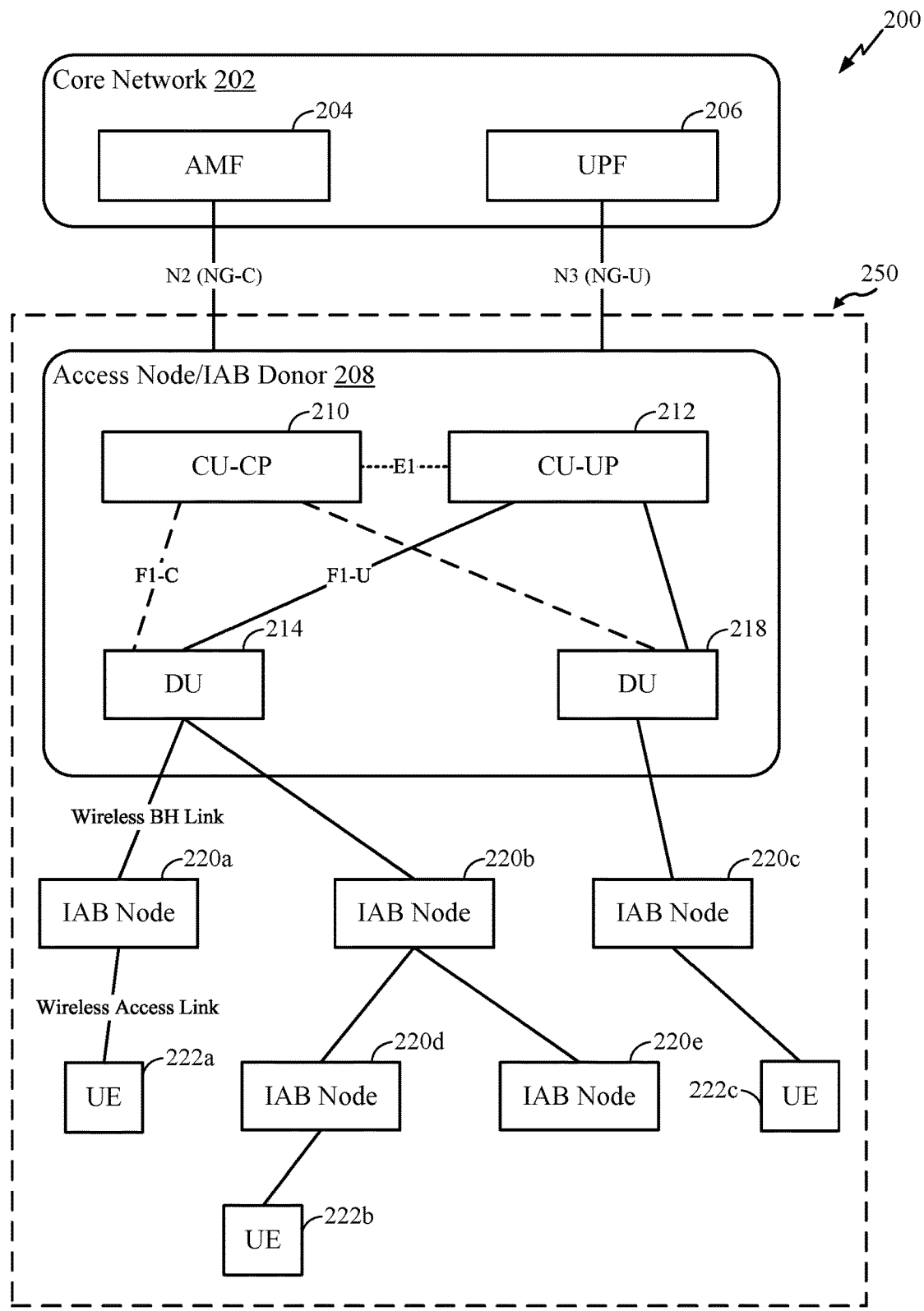
FIG. 2 is a block diagram conceptually illustrating an example architecture of a distributed radio access network (RAN), in accordance with certain aspects of the present disclosure.

FIG. 2 illustrates an example architecture of a distributed radio access network (RAN) 200 that includes an example IAB network 250, which may be implemented in the wireless communication network 100 illustrated in FIG. 1. As shown in FIG. 2, the distributed RAN includes a core network (CN) 202 and an access node (AN) configured as an IAB donor 208.

The JAB donor node 208 is a RAN node (e.g., AP/gNB that terminates the NR NG interface with the core network (e.g., next generation NG core)) and is generally connected to the CN 202 via a wireline backhaul link. The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The JAB donor 208 may communicate with the CN 202 (e.g., via a backhaul interface). The JAB donor 208 may communicate with the AMF 204 via an N2 (e.g., NG-C) interface. The JAB donor 208 may communicate with the UPF 206 via an N3 (e.g., NG-U) interface. The JAB donor 208 may include a central unit-control plane (CU-CP) 210, one or more central unit-user plane (CU-UPs) 212, one or more distributed units (DUs) 214-218, and one or more antenna/remote radio units (AU/RRUs) (not shown). The CUs and DUs may also be referred to as gNB-CU and gNB-DU, respectively.

An JAB donor node 208 may also be referred to as an JAB anchor node and may include an JAB CU (e.g., NR CU) or an JAB DU (e.g., NR DU). The JAB network 250 further includes one or more non-donor JAB nodes (e.g., 220a-220e). Each JAB node (including donor JAB node 208 and non-donor JAB nodes 220a-220e) may serve one or more UEs (e.g., 222a-222c) connected to an JAB node. As shown, the JAB nodes, including the donor JAB node 208, may be connected via wireless backhaul links (e.g., NR wireless backhaul links or backup NR wireless backhaul links). Each JAB node connects to its served UEs via respective access links.

Each JAB node is a RAN node (e.g., AP/gNB) that provides JAB functionality with two roles including data unit function (DU-F) and a mobile termination function (MT-F). The DU-F of an JAB node is generally responsible for scheduling UEs (e.g., served by the JAB node) and other JAB nodes (e.g., that are connected as child nodes to the JAB node). The DU-F also controls both access and backhaul links under its coverage. The MT-F of an JAB node is controlled and scheduled by an JAB donor node or another JAB node as its parent JAB node. In an aspect, the JAB donor node 208 only includes DU-F and no MT-F.

The CU-CP 210 may be connected to one or more of the DUs 214-218. The CU-CP 210 and DUs 214-218 may be connected via a wireline interface using F1-C protocols. As shown in FIG. 2, the CU-CP 210 may be connected to multiple DUs, but the DUs may be connected to only one CU-CP. Although FIG. 2 only illustrates one CU-UP 212, the IAB donor 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-UP(s) 212 may be connected to one or more of the DUs 214, 218. The CU-UP(s) 212 and DUs 214, 218 may be connected via a F1-U interface. As shown in FIG. 2, the CU-CP 210 may be connected to multiple CU-UPs, but the CU-UPs may be connected to only one CU-CP.

A DU, such as DUs 214 and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214, 218 may be connected with one of AU/RRUs.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, IAB donor 208 may support dual connectivity with NR and may share a common fronthaul for LTE and NR. The distributed RAN 200 may enable cooperation between and among DUs 214, 218, for example, via the CU-UP 212. An inter-DU interface may not be used.

Logical functions may be dynamically distributed in the distributed RAN 200. As will be described in more detail with reference to FIG. 4, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
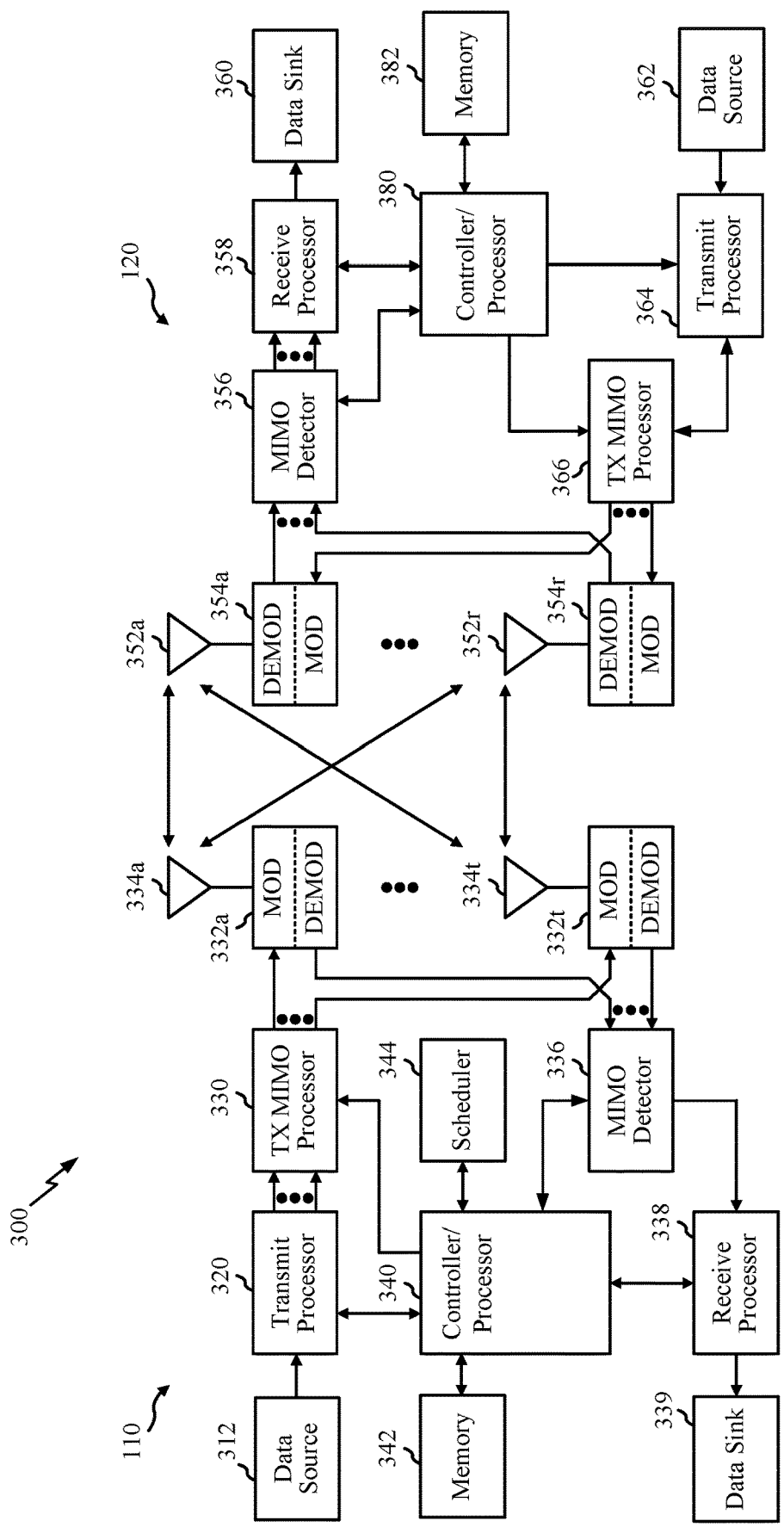
FIG. 3 illustrates example components of an access point (AP) and a user equipment (e.g., a repeater), in accordance with certain aspects of the present disclosure.

FIG. 3 illustrates example components 300 of AP 110 and UE 120 (e.g., repeater) (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the AP 110 may be used to perform the various techniques and methods described herein with reference to FIG. 7 and/or FIG. 8.

At the AP 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) MIMO processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. DL signals from modulators 332a through 332t may be transmitted via the antennas 334a through 334t, respectively.

At the UE 120, the antennas 352a through 352r may receive the DL signals from the AP 110 and may provide received signals to the demodulators (DEMODs) in transceivers 354a through 354r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (RS) (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the AP 110. At the AP 110, the UL signals from the UE 120 may be received by the antennas 334, processed by the modulators 332, detected by a MIMO detector 356 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the AP 110 and the UE 120, respectively. The processor 340 and/or other processors and modules at the AP 110 may perform or direct the execution of processes for the techniques described herein. The memories 342 and 382 may store data and program codes for AP 110 and UE 120, respectively. A scheduler 344 may schedule UEs for data transmission on the DL and/or UL.

Figure 4:
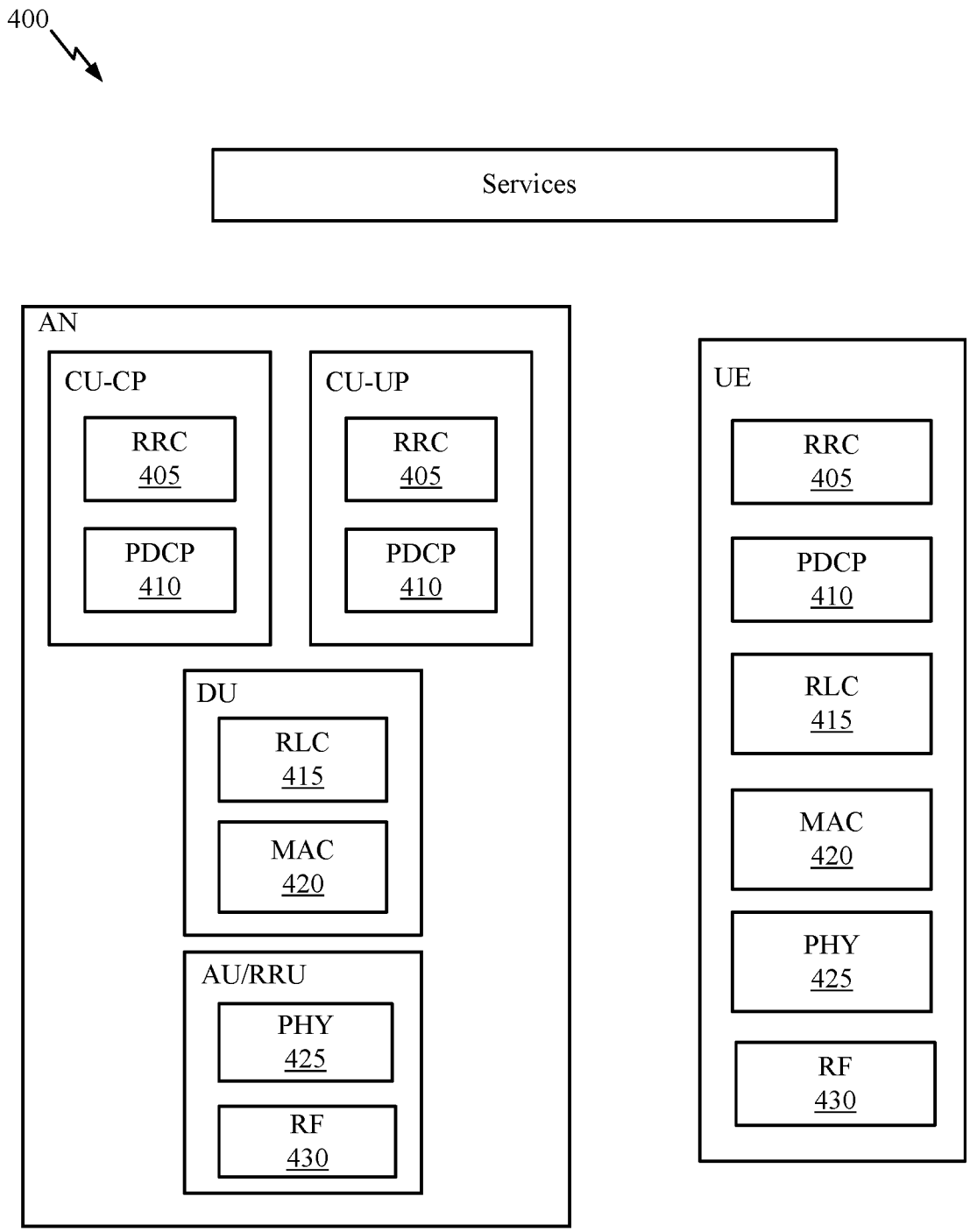
FIG. 4 is a block diagram illustrating an example communications protocol stack in a RAN, in accordance with certain aspects of the present disclosure.

FIG. 4 illustrates a diagram showing examples for implementing a communications protocol stack 400 in a RAN (e.g., such as the RAN 200), according to aspects of the present disclosure. The illustrated communications protocol stack 400 may be implemented by devices operating in a wireless communication system, such as a 5G NR system (e.g., the wireless communication network 100). In various examples, the layers of the protocol stack 400 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by an AN (e.g., AN 208 in FIG. 2, or AP 110a in FIG. 1 and FIG. 2) and/or a UE (e.g., UE 120 in FIG. 1 and FIG. 2).

As shown in FIG. 4, the protocol stack 400 is split in the AN. The RRC layer 405, PDCP layer 410, RLC layer 415, MAC layer 420, PHY layer 425, and RF layer 430 may be implemented by the AN. For example, the CU-CP (e.g., CU-CP 210 in FIG. 2) and the CU-UP e.g., CU-UP 212 in FIG. 2) each may implement the RRC layer 405 and the PDCP layer 410. A DU (e.g., DUs 214 and 218 in FIG. 2) may implement the RLC layer 415 and the MAC layer 420. However, the DU may also implement the PHY layer(s) 425 and the RF layer(s) 430 via an AU/RRU connected to the DU. The PHY layers 425 may include a high PHY layer and a low PHY layer.

The UE (e.g., UE 222a-222c in FIG. 2) may implement the entire protocol stack 400 (e.g., the RRC layer 405, the PDCP layer 410, the RLC layer 415, the MAC layer 420, the PHY layer(s) 425, and the RF layer(s) 430).

Figure 5:
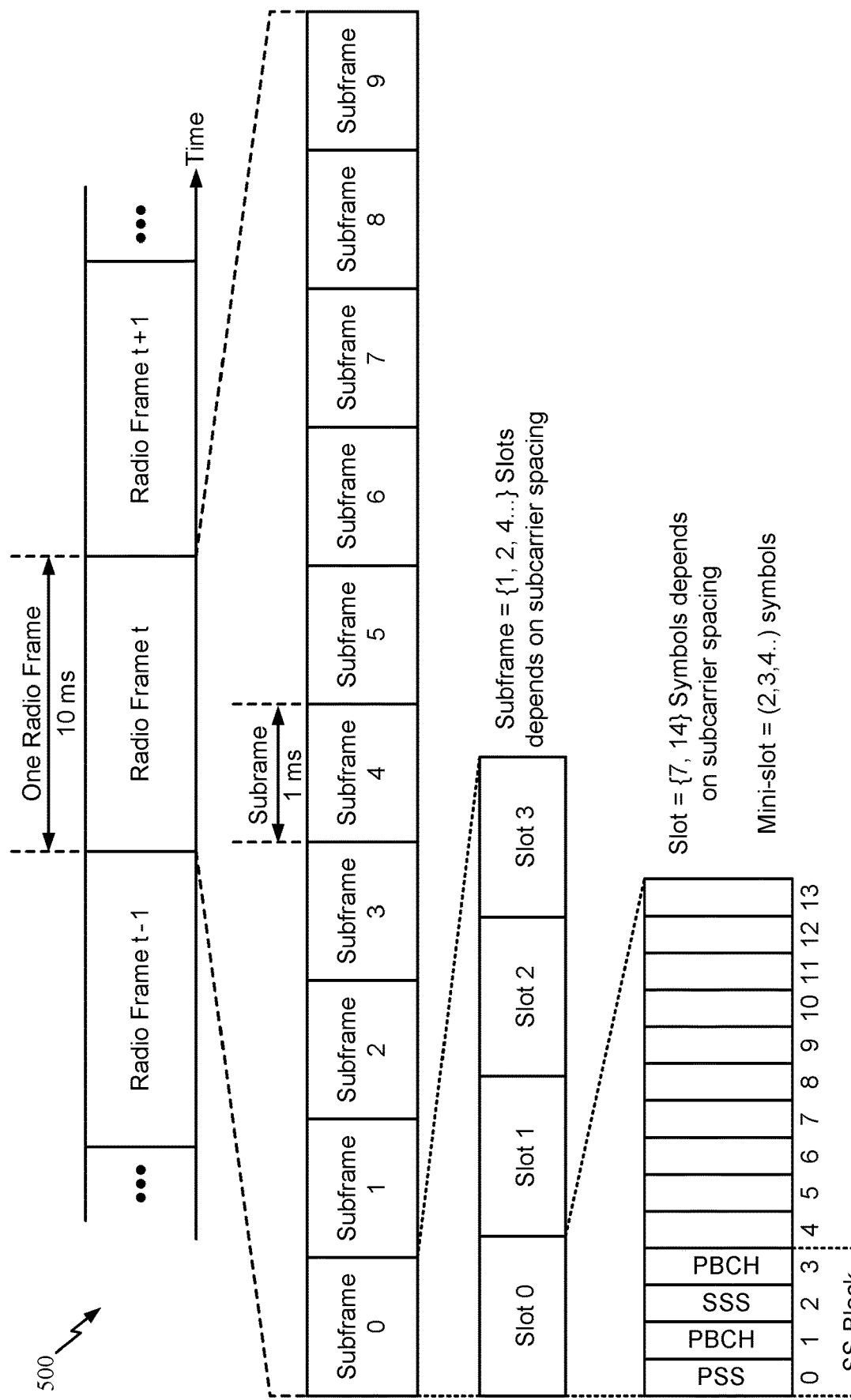
FIG. 5 is a block diagram is a diagram illustrating an example of a frame format for new radio (NR), in accordance with certain aspects of the present disclosure.

FIG. 5 is a diagram showing an example of a frame format 500 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing (SCS). The symbol periods in each slot may be assigned indices. A mini-slot, which may be referred to as a sub-slot structure, refers to a transmit time interval (TTI) having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, a SSS, and a two symbol PBCH. The SSB can be transmitted in a fixed slot location, such as the symbols 0-3 as shown in FIG. 5. The PSS and SSS may be used by UEs for cell search and acquisition. The PSS may provide half-frame timing, the SSS may provide the CP length and frame timing. The PSS and SSS may provide the cell identity. The PBCH carries some basic system information, such as DL system bandwidth, timing information within radio frame, SS burst set periodicity, system frame number, etc. The SSB may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for millimeter wave (mmW). The up to sixty-four transmissions of the SSB are referred to as the SS burst set. SSBs in an SS burst set are transmitted in the same frequency region, while SSBs in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or AP), even though the scheduling entity may be utilized for scheduling and/or control purposes. In some examples, the sidelink signals may be communicated using a licensed spectrum (unlike wireless local area networks (WLANs), which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Next generation (5G) wireless networks have stated objectives to provide ultra-high data rate and support wide scope of application scenarios. IAB systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions, and a particular architecture deployed may depend on what layers of protocol stack are implemented in the intermediate nodes (IAB-nodes), for example, L2 relays may implement PHY/MAC/RLC layers.

Certain aspects of the present disclosure relate to L1 relays (referred to as repeaters). L1 relays/repeaters have many attractive features. For example, such repeaters are relatively simple, low-cost, low-power, and are wirelessly connected to a donor or another relay (e.g., a gNB).

Example Signaling for Relaying Prior to Decoding

Relays may be generally deployed to provide coverage extension. For example, if a direct link between two nodes (e.g., link A→C, between Nodes A and C) is poor, a relay (Node B) may be used to provide a better path (A→B→C). Relays may also be used to provide diversity and/or robustness, for example, using both a direct link (e.g., link A→C) and an indirect link (A→B→C), so that if one path fails, the other is available. As noted above, relays may also apply in the context of integrated access and backhaul (IAB) relaying, as well as sidelink relaying (relaying between two UEs). A relay node may be, for example, a repeater user equipment (UE).

Relays are typically classified as analog or decode-and-forward. An analog relay is relatively simple and inexpensive. An analog relay simply receives the waveform in a particular band and forwards it as is.

Decode-and-forward relays, on the other hand, typically have a receiver similar to a receiver of the destination node. Decode-and-forward relays decode, re-encode, and forward the transmission (e.g., a packet) to the next node (e.g., 3GPP Release 16 IAB relaying). This forwarding may happen at layer 1 (L1) (physical (PHY)), layer 2 (L2) (medium access control (MAC)/radio link control (RLC)), or layer 3 (L3) (radio resource control (RRC)) layers, depending on an amount of further processing occurring at the relay node in between its receive function and transmit function.

Figure 6:
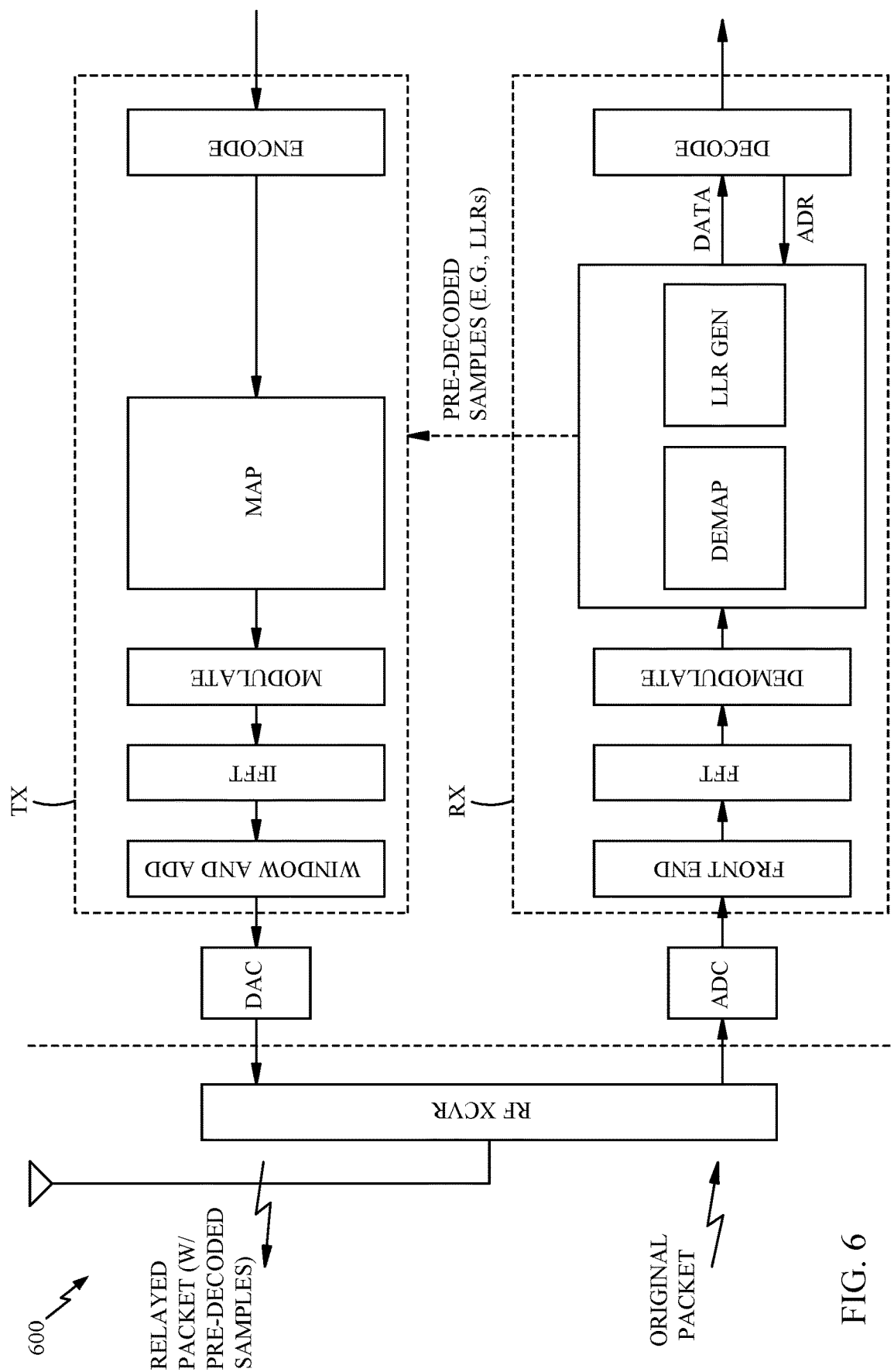
FIG. 6 is a block diagram of an example wireless relay, in which aspects of the present disclosure may be implemented.

FIG. 6 is a block diagram of an example wireless relay, in which aspects of the present disclosure may be implemented. As illustrated in FIG. 6, in some cases, a relay may function "in-between" analog relays and decode-and-forward relays. With such relays, some amount of baseband processing may occur; however, relaying may begin prior to decoding. For example, as illustrated, the relay node may receive an original packet and forward a relayed packet with pre-decoded samples (e.g., log-likelihood ratios (LLRs)) taken from the waveform of the original packet.

Examples of such relaying may include forwarding of in-phase/quadrature (IQ) samples at analog/digital (A/D) conversion, forwarding modulation symbols after orthogonal frequency-division multiplexing (OFDM) Fast Fourier Transform (FFT) or after equalization, forwarding LLR input to a decoder of channel code (e.g., low-density parity-check code (LDPC) decoder), or computing by intermediate operation of the decoder prior to packet decoding.

In this manner, a transmitter node (Node A) (also referred to herein as a parent node) may transmit a first packet (e.g., source packet) to relay node (Node B) (also referred to herein as a repeater). In some cases, the transmitter node (Node A) may be a network entity (e.g., a BS or gNB)). Node B may generate pre-decoded samples (e.g., LLRs, IQ samples, etc.) of the first packet and transmit a second packet with the pre-decoded samples to a receiver node (Node C) (also referred to herein as a child node). Node C may decode the second packet (e.g., relayed packet) with the pre-decoded samples to recover the first packet.

In some cases, compression may be used to reduce the size of the relayed packet. For example, if the pre-decoded samples are LLRs, each LLR may represent one information bit inside a decoder. LLRs generally represent how likely the signal is either 0 or 1. A large positive LLR value indicates that the decoder believes the information bit represented by the LLR value is 1, while a large negative LLR value indicates that the decoder believes that the information bit represented by the LLR value is 0. LLRs may take on a range of values and require more bits (e.g., 8 bits) to represent a 1 information bit. Without compression, a relayed packet containing 8-bit LLRs may be 8× larger.

The compression scheme used for pre-decoded samples may be any suitable compression scheme. For example, the compression scheme may be Lempel-Ziv-Welch (LZW), Huffman coding, Burroughs-Wheeler scheme, or standard implementations thereof such as gzip or bzip2. In some cases, the compression schemes may be based on the nature of LLRs. For example, the compression scheme may involve compressing an N-bit LLR value to fewer bits, for example, by quantizing different LLRs to different precision (e.g., number of bits).

By relaying pre-decoded samples, relays may reduce the relaying latency (e.g., by eliminating decoding time) to the transmission destination (Node C in the example above). Such relaying may also be used to implement cooperative decoding, for example, where the transmission destination is Node B (that may send pre-decoded samples to another node for decoding).

In a system utilizing pre-decoded relaying, it may be important to indicate, to a relay node and/or receiver node, when pre-decoded relaying may be used. In other words, a relay node may need to know when to relay packets with pre-decoded samples of a source packet, while the receiver node may need to know when a relayed packet includes pre-decoded samples.

Aspects of the present disclosure provide mechanisms for signaling an indication that relayed packets include information generated prior to decoding (e.g., pre-decoded samples, such as LLRs).

Figure 7:
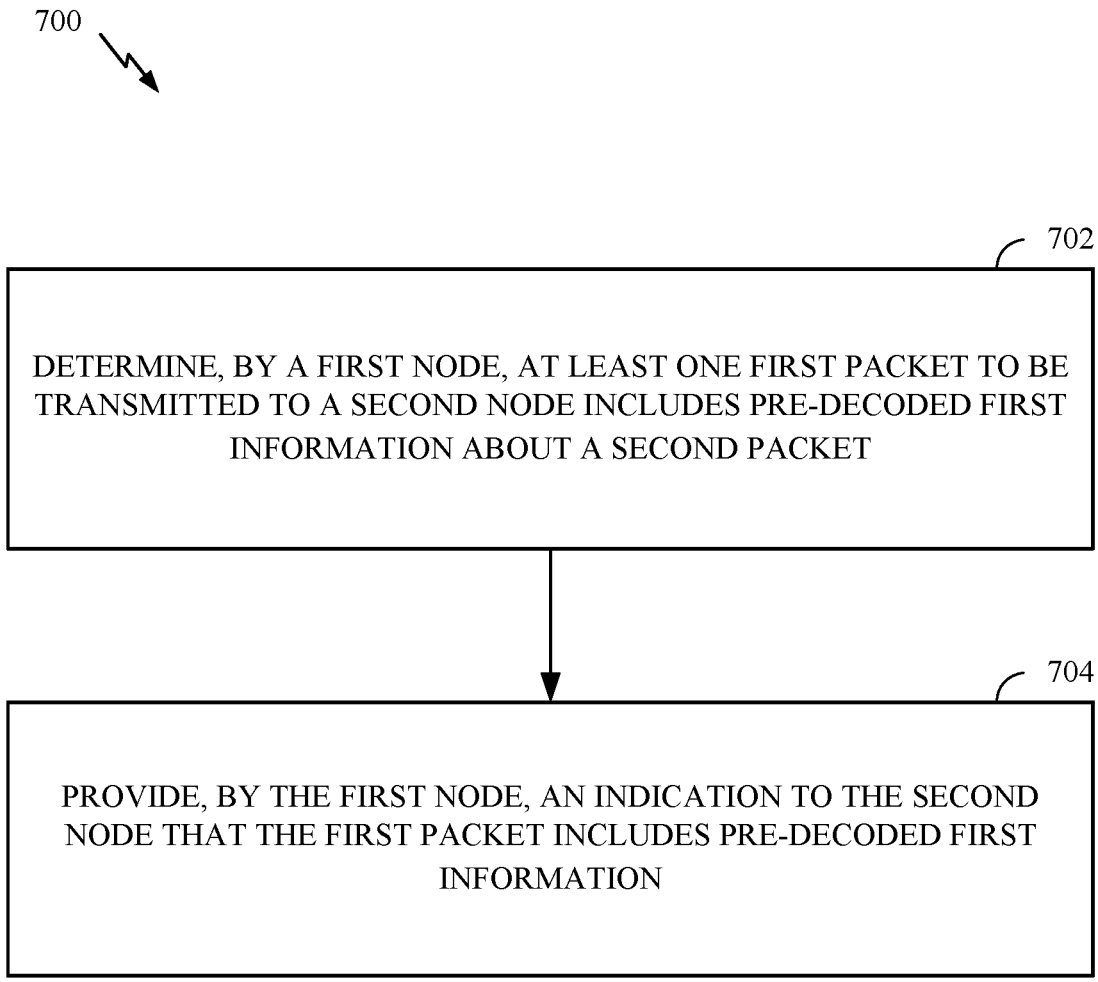
FIG. 7 illustrates example operations for wireless communications by a wireless relay node, in accordance with certain aspects of the present disclosure.

FIG. 7 illustrates example operations 700 for wireless communication by a first wireless node (e.g., a relay node such as a repeater user equipment (UE), a network entity such as an access point (AP), base station (BS), or next generation NodeB (gNB), or another node), in accordance with certain aspects of the present disclosure.

In some aspects, the operations 700 may be performed, for example, by a UE acting as a repeater (e.g., any of the repeaters shown in FIGS. 1, 2, and 3). The operations 700 may be implemented as software components that are executed and run on one or more processors (e.g., controller/processor 380 of FIG. 3). Further, the transmission and reception of signals by the repeater in operations 700 may be enabled, for example, by one or more antennas (e.g., antennas 352 of FIG. 3). In certain aspects, the transmission and/or reception of signals by the repeater may be implemented via a bus interface of one or more processors (e.g., controller/processor 380 of FIG. 3) obtaining and/or outputting signals.

In some aspects, the operations 700 may be performed, for example, by a network entity (e.g., a base station (BS)/next generation NodeB (gNB)). The operations 700 may be implemented as software components that are executed and run on one or more processors (e.g., controller/processor 340 of FIG. 3). Further, the transmission and reception of signals by the network entity in operations 700 may be enabled, for example, by one or more antennas (e.g., antennas 354 of FIG. 3). In certain aspects, the transmission and/or reception of signals by the network entity may be implemented via a bus interface of one or more processors (e.g., controller/processor 340 of FIG. 3) obtaining and/or outputting signals.

Operations 700 begin, at block 702, by a first node determining at least one first packet to be transmitted to a second node includes pre-decoded first information about a second packet. At block 704, the first node provides an indication to the second node that the first packet includes pre-decoded first information. In some examples, the first node is a transmitter node (e.g., AP, BS, gNB), and the indication is provided by the transmitter node. In some examples, the first node is a relay node (e.g., UE acting as a repeater) and the indication is provided by the relay node. In some examples, the first packet is transmitted to the second node by a relay node, and the second packet comprises a source packet from a transmitter node.

Figure 8:
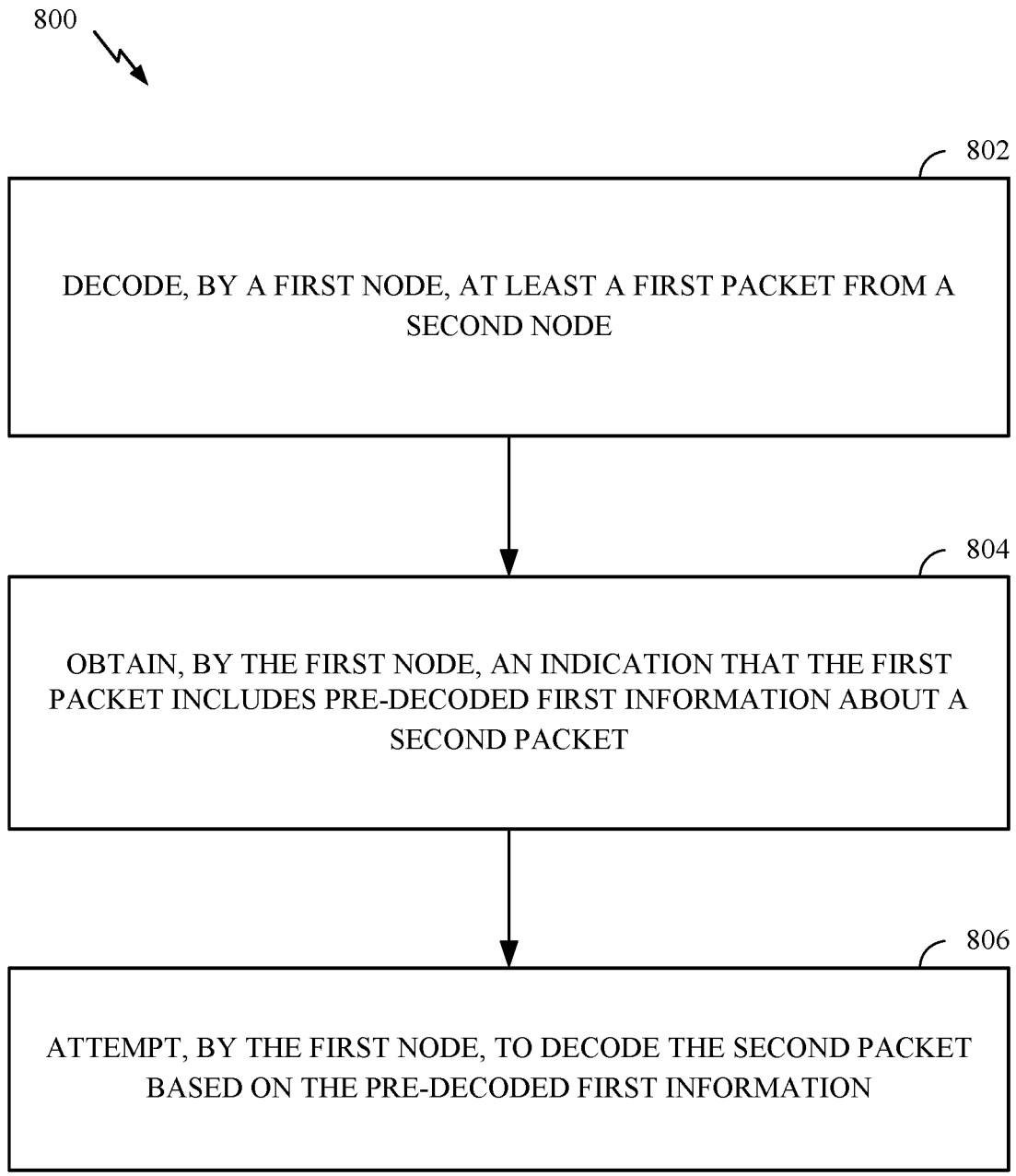
FIG. 8 illustrates example operations for wireless communications by a wireless receiver node, in accordance with certain aspects of the present disclosure.

FIG. 8 illustrates example operations 800 for wireless communication by a first wireless node (e.g., a receiver node), in accordance with certain aspects of the present disclosure.

The operations 800 may be performed, for example, by a wireless receiver node. In some aspects, the wireless receiver node may be any of the UEs shown in FIGS. 1, 2, and 3 to receive and process a packet from a repeater (e.g., relay node performing operations 700). The operations 800 may be implemented as software components that are executed and run on one or more processors (e.g., controller/processor 380 of FIG. 3). Further, the transmission and reception of signals by the repeater in operations 800 may be enabled, for example, by one or more antennas (e.g., antennas 352 of FIG. 3). In certain aspects, the transmission and/or reception of signals by the repeater may be implemented via a bus interface of one or more processors (e.g., controller/processor 380 of FIG. 3) obtaining and/or outputting signals.

In some aspects, the wireless receiver node may be any of the BSs/gNBs shown in FIGS. 1, 2, and 3. The operations 800 may be implemented as software components that are executed and run on one or more processors (e.g., controller/processor 340 of FIG. 3). Further, the transmission and reception of signals by the repeater in operations 800 may be enabled, for example, by one or more antennas (e.g., antennas 354 of FIG. 3). In certain aspects, the transmission and/or reception of signals by the network entity may be implemented via a bus interface of one or more processors (e.g., controller/processor 340 of FIG. 3) obtaining and/or outputting signals.

Operations 800 begin, at block 802, by a first node (e.g., wireless receiver node) decoding at least a first packet from a second node. At block 804, the first node obtains an indication that the first packet includes pre-decoded first information about a second packet. At block 806, the first node attempts to decode the second packet based on the pre-decoded first information.

Figure 9:
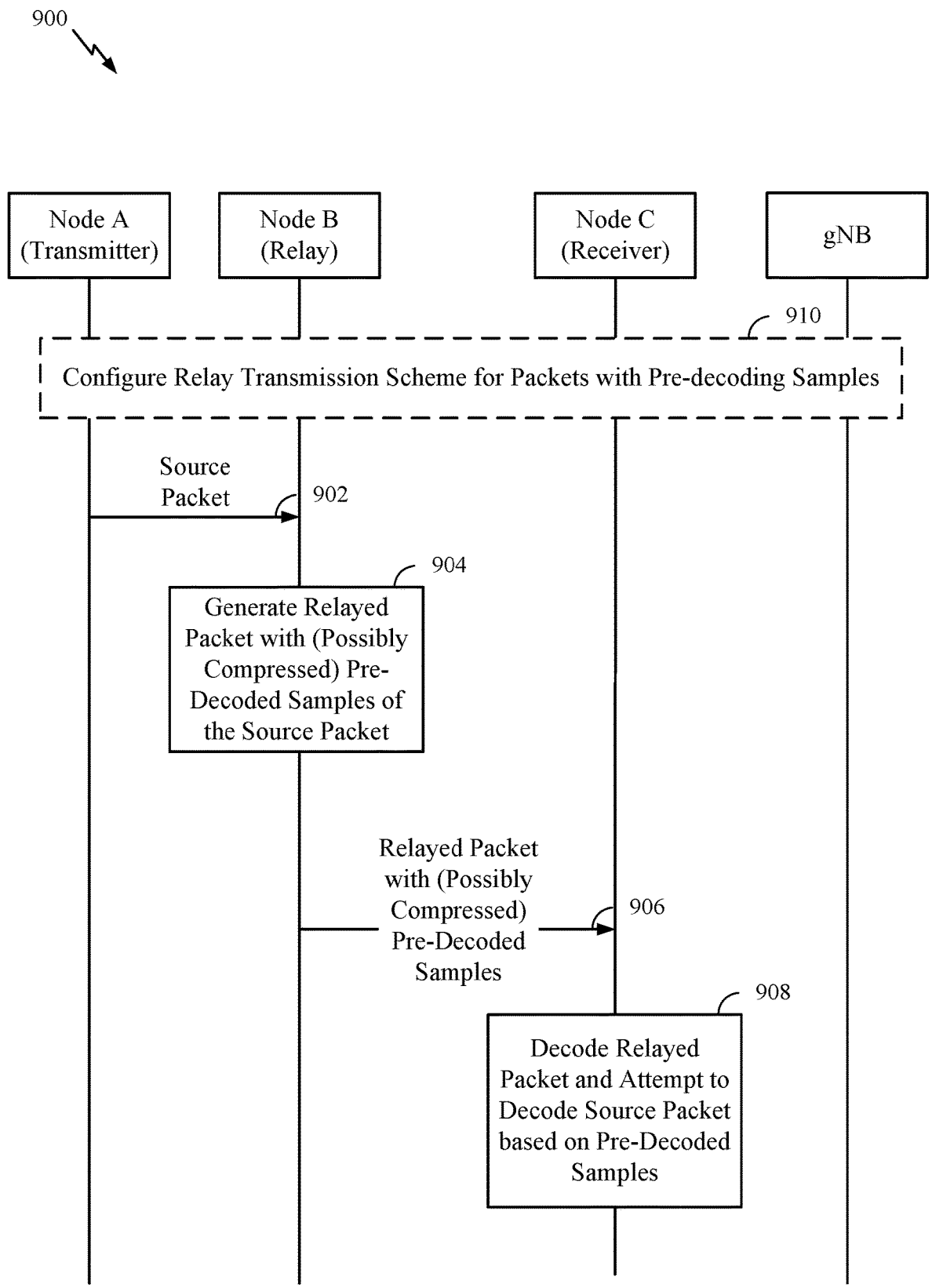
FIG. 9 is a call flow diagram illustrating relaying pre-decoded samples of a packet, in accordance with certain aspects of the present disclosure.

Operations 700 and 800 of FIGS. 7 and 8 may be understood with reference to the call flow diagram 900 of FIG. 9, which shows how a wireless relay node (Node B) may relay a source packet from a wireless transmitter node (Node A) to a wireless receiver node (Node C). In other words, Node B, or the gNB, may perform operations 700 of FIG. 7 (to indicate relayed packets will include pre-decoded information), while Node C performs operations 800 of FIG. 8.

As illustrated, at 902, Node A may transmit a source packet (e.g., a first packet) to Node B. At 904, Node B may generate a relayed packet (e.g., a second packet) with pre-decoded samples (e.g., LLRs, IQ samples, etc.) of the first packet and, at 906, may transmit the relayed packet with pre-decoded samples to Node C. At 908, Node C may decode the relayed packet and attempt to decode (recover) the source packet based on the pre-decoded samples. As noted above, in some cases, the Node B may compress the pre-decoded samples prior to relaying. In such cases, Node C may perform a de-compression of the pre-decoded samples before attempting to recover the source packet.

As noted above, to enable the pre-decoded sample based relaying scheme described herein, the wireless receiver node (e.g., Node C) may need to have sufficient information to understand the content of the relayed packets (e.g., type of pre-decoded samples) and, if compressed, the compression format, so that the wireless receiver node may be able to (decompress and) decode the pre-decoded samples to recover the underlying source packet.

As shown in FIG. 9, in some cases, at 910, the Nodes may coordinate the relay transmission scheme used by the relay node (Node B) for compressing pre-decoded samples. The relay node may compress pre-decoded samples of the first packet according to the coordinated compression scheme. The scheme may be set by Node A, B, C, or a coordinating central node (such as a gNB), or by a combination of these nodes working in coordination with each other.

For example, the nodes may coordinate via exchange messages to determine the compression scheme via a Uu interface (referring to the link between a network entity and UE), sidelink (SL) master information block (MIB), system information block (SIB), radio resource control (RRC), MAC control element (CE), downlink control information (DCI), sidelink control information (SCI), or a combination thereof. In some cases, a scheduling DCI (e.g., scheduling the transmission being relayed), SCI, or MAC-CE included with the packet may indicate that the packet contains LLRs, as well as the LLR format.

As noted above, it is important that a receiver node (e.g., Node C in FIG. 9) is provided some sort of indication as to whether content of a (relayed) packet is pre-decoded or regular (post-decoded).

Because pre-decoded relaying is often intended for low latency, an RRC configuration may not be best suited for dynamically indicating a pre-decoded packet. However, an RRC configuration may be useful to configure many semi-static attributes related to the nature of the pre-decoded packets. Examples of such semi-static attributes may include, for example, a number of bits per sample (for IQ samples, LLRs, etc.).

RRC signaling may also be used as the sole form of indication in some cases. For example, a node may only transmit pre-decoded packets (e.g., for security reasons, the node may not be allowed to decode). In such cases, RRC signaling may be used to configure the recipient nodes to receive only pre-decoded packets. The configuration may apply to all packets transmitted from the node, or to a restricted set of packets transmitted from the node. For example, the configuration may apply to only packets transmitted on a particular frequency range, cell-group, component carrier (CC), a particular subband or bandwidth part (BWP), and/or the configuration may also apply only to packets transmitted within a particular time-duration. In some cases, a configuration may indicate that all transmissions on a certain configured-grant (CG) (e.g., periodic uplink (UL) resources) are always pre-decoded.

In some cases, the indication of pre-decoded packets may be provided via MAC signaling or mechanisms. For example, certain logical channel-IDs (LCIDs) may always be associated with pre-decoded relaying. In such cases, a mapping may be defined between LCID(s) and corresponding 'regular' packet LCIDs, for nodes that send both pre-decoded and regular packets.

In some cases, a MAC subheader may be augmented to include an indication, or a new additional MAC subheader may be defined, that explicitly includes 'pre-decoded relaying' fields for the corresponding MAC sub protocol data unit (sub-PDU). In some cases, a new MAC-CE may be defined to include pre-decoded packet information for all the other MAC sub-PDUs or MAC service data units (MAC-SDUs) included within a transport block (TB).

In some cases, the indication of pre-decoded packets may be provided via L1 (PHY layer) signaling. For example, DCI, SCI, and/or uplink control information (UCI) may indicate pre-decoded packets. In some cases, the DCI, SCI, and/or UCI may include explicit fields. In some cases, the DCI, SCI, and/or UCI may include an indirect indication, such as an indication of an LCID mapped to pre-decoded relaying (as in the MAC example described above).

In the various cases described above, the indication of a pre-decoded packet may indicate that the packet content is pre-decoded only (e.g., 'pure LLRs') or contains a mix of pre-decoded and post-decoded content (e.g., a 'mixed packet' with LLRs and post-decoded bits). Further, different LLRs may be quantized to different precision, and regular bits may be treated as 'hard-quantized LLRs'. For example, LLRs may be sent for some code blocks/code block groups (CBs/CBGs), while regular bits may sent for others.

Based on the indication that a packet is a pre-decoded packet, by any of the signaling mechanisms described above, a receiver node (e.g., Node C in FIG. 9) may decode the received packet and use the pre-decoded samples to attempt to decode a parent (source) packet.

For this decoding, the receiver node may need additional information related to the parent packet including, for example, TB size (TBS) and the like. Another node (e.g., the parent (transmitter) node (Node A in FIG. 9) or relay node (Node B in FIG. 9)), also attempting to decode the parent packet, may be provided this information in different ways (e.g., an RRC configuration, DCI, or SCI grant). Depending upon the type of pre-decoded information, not all information provided to a parent (transmitter) node may be needed by a receiver node. Therefore, in some cases, the parent/relay node may repackage and provide only the relevant information to the receiver node, for example, via RRC signaling, MAC-CE, or DCI/SCI.

A child (receiver) node may also need information about the format/construction of the pre-decoded packet. Such information may include a number of bits per pre-decoded sample (per LLR or per IQ sample), quantization, and/or a compression scheme used on the samples. This information may be different for different subsets of samples. For example, the relayed packet may include LLRs corresponding to different CBs/CBGs of the parent packet, and hard-decoded (post-decoded) bits may be provided for other CBs/CBGs. For example, a child (receiver) node may be provided an indication of a number of iterations of the parent (transmitter) node decoder after which LLRs were sent over in the pre-decoded packet. This information may be useful to optimize the child (receiver) node decoding of the parent packet (e.g., when to early-check for cyclic redundancy check (CRC) pass, etc.). This type of information may also be provided via RRC/MAC-CE/DCI, together with, or separate from, the parent packet information described above.

Various information about the parent packet parameters may also be conveyed for relaying LLRs. For example, each coded bit in the parent packet may map to an LLR which the child (receiver) node has identified (e.g., after decompressing, interpreting quantizer format, identifying hard-bits/CBs versus LLRs). Various other information may also be provided, such as a coding scheme, indicating a LDPC/Polar encoding, a number of information bits (#infobits) of the parent packet, CRC size, base graph used, and the like.

For Uu downlink (DL) transmissions, a parent (transmitter) node may determine the TBS using resource block (RB) allocation and modulation coding scheme (MCS) indicated in the grant and the number of demodulation reference signals (#DMRS, which depends on RRC parameters). The LDPC base graph may be based on the TBS and a coding-rate indicated by an MCS index (in the grant).

The parent (transmitter) node/relay node may need the MCS and allocation to extract modulation symbols, demodulate, demap, and compute LLRs. A child (receiver) node receiving only LLRs, may not need the parent node MCS and allocation, as long as it has the TBS and base graph. Therefore, an example of repackaging relevant information described above may be used to indicate only TBS and base graph to the child (receiver) node.

If IQ samples or modulation symbols are relayed, the child (receiver) node may reconstruct the received resource elements (REs) by interpreting the received pre-decoded packet. In such cases, the child (receiver) node may need to know information such as which REs correspond to data, which REs correspond to DMRS, which REs correspond to un-populated symbols (e.g., based on a rate-matching configuration), and whether any REs in the grid were not included in the pre-decoded packet. The child (receiver) node may then need to arrange the REs in an RB grid (e.g., indicating a number of OFDM symbols or #REs/OFDM symbol). The child (receiver) node may not need to know exactly where the REs are located in 'absolute' time and frequency, rather information may be relative to slot-boundary/point-A. The parent (transmitter) node may need to know both the size and location, thus the indication may be bundled (e.g., a starting and length indicator vector or SLIV may indicate time-allocation in terms of a starting location as well as length). As noted above, only relevant information may be repackaged in some cases (e.g., rather than indicating SLIV, just the length L may be provided in terms of a number of OFDM symbols).

In some cases, multiple child pre-decoded packets may be sent for the same parent packet. For example, the pre-decoded packets may be larger than their corresponding decoded packets. In such cases, the parent packet may have only information bits, while the pre-decoded packet has, for example, N-bit LLRs for each coded-bit of the parent packet. Thus, the parent packet may need to be split into multiple pre-decoded packets.

Even in cases where only a single packet has all the LLRs and is received by a child (receiver) node, another such packet may be sent with updated LLRs. Some parent information may be common across multiple packets (e.g., TBS), while some information may be different (e.g., CB/CBG indices for which pre-decoded information is included).

In some cases, instead of duplicating common information, multiple pre-decoded packets subject to the common information may be linked. For example, similar to the concept of special MCS values (e.g., 26, 27, 28) used on Uu to indicate a same MCS as previously used, a similar concept may be applied to the parent packets. In some cases, the linkage may be implicit, such that the common information is the same as a most recently received or acknowledged packet indicated to be pre-decoded. In other cases, the linkage may be explicit, such as an explicit indication in a packet whose grant (physical downlink control channel (PDCCH)/physical sidelink control channel (PSCCH)) or allocation (physical downlink shared channel (PDSCH)/physical sidelink shared channel (PSSCH)) was received in a time-frequency resource, or whose grant has indicated properties (e.g., hybrid automatic repeat request process ID (HARQprocessID)). Using such an approach for linkage may incur a risk of wasting the second packet, for example, in cases where information for the first packet was missed. This risk may be mitigated, for example, by waiting for acknowledgment (ACK) of the first packet (or an ACK for its grant) before transmitting the second packet.

As described herein, by relaying pre-decoded samples to a receiver node, relaying latency may be reduced. Further, by compressing the pre-decoded samples, payload size may be managed. Such relaying techniques may also be used to implement cooperative decoding, for example, where the transmission destination is a repeater (that may send pre-decoded samples to another node for decoding) (e.g., Node B in FIG. 9).

Example Wireless Communications Devices

Figure 10:
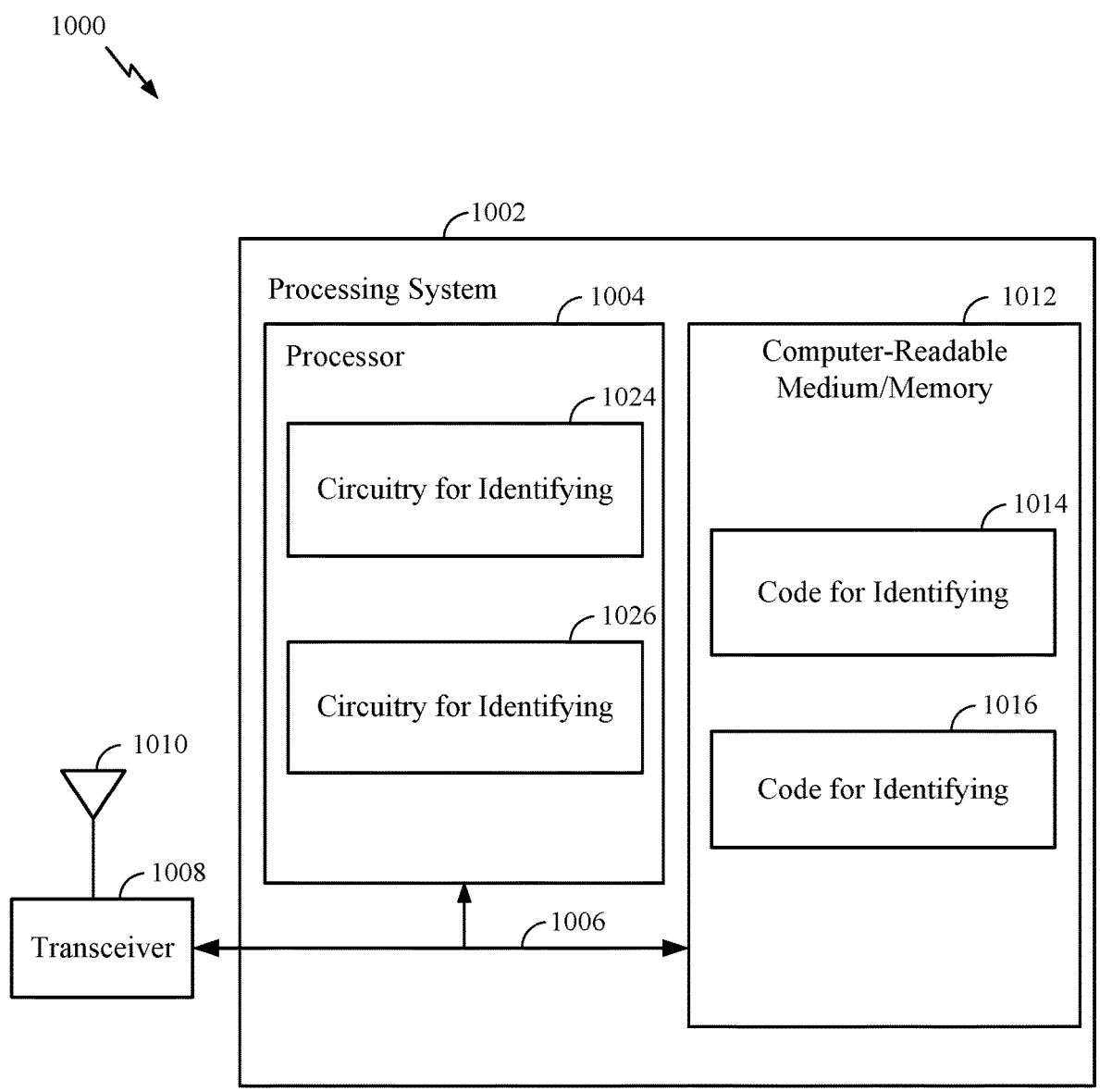
FIG. 10 illustrates a communications device that may include various components configured to perform the operations illustrated in FIG. 7, in accordance with certain aspects of the present disclosure.

FIG. 10 depicts an example communications device 1000 that includes various components operable, configured, or adapted to perform operations for the techniques disclosed herein, such as the operations depicted and described with respect to FIGS. 7 and 9. In some examples, communications device 1000 may be a user equipment (UE) acting as a repeater or by a network entity (e.g., a base station (BS)/next generation NodeB (gNB)) as described, for example with respect to FIGS. 1, 2, 3, and 6.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1004 coupled to a computer-readable medium/memory 1012 via a bus 1006. In certain aspects, computer-readable medium/memory 1012 is configured to store instructions (e.g., computer-executable code) that when executed by the one or more processors 1004, cause the one or more processors 1004 to perform the operations illustrated in FIGS. 7 and 9, or other operations for performing the various techniques discussed herein for relaying.

In certain aspects, computer-readable medium/memory 1012 stores code 1014 for determining; and code 1016 for providing.

In some cases, code 1014 for determining may include code for determining at least one first packet to be transmitted to a second node includes pre-decoded first information about a second packet. In some cases, code 1016 for providing may include code for providing an indication to the second node that the first packet includes pre-decoded first information.

In certain aspects, the one or more processors 1004 include circuitry configured to implement the code stored in the computer-readable medium/memory 1012, including circuitry 1024 for determining; and circuitry 1026 for providing.

In some cases, circuitry 1024 for determining may include circuitry for determining at least one first packet to be transmitted to a second node includes pre-decoded first information about a second packet. In some cases, circuitry 1026 for providing may include circuitry for providing an indication to the second node that the first packet includes pre-decoded first information.

In some cases, the operations illustrated in FIG. 7, as well as other operations described herein, may be implemented by one or more means-plus-function components. For example, in some cases, such operations may be implemented by means for determining and means for providing.

In some cases, means for determining and means for providing, includes a processing system, which may include one or more processors, such as the receive processor 358 (or receive processor 338), the transmit processor 364 (or transmit processor 320), the TX MIMO processor 366 (TX MIMO processor 330), and/or the controller/processor 380 (controller/processor 340) of the UE (e.g., a repeater) 120 illustrated in FIG. 3 and/or the processing system 1002 of the communication device 1000 in FIG. 10.

In some cases, means for determining and means for providing, includes a processing system, which may include one or more processors, such as the receive processor 338, the transmit processor 320, the TX MIMO processor 330, and/or the controller/processor 340 of the access point (AP) 110 illustrated in FIG. 3 and/or the processing system 1002 of the communication device 1000 in FIG. 10.

The transceiver 1008 may provide a means for receiving or transmitting information such as packets, user data, or control information associated with various information channels (e.g., control channels, data channels, information related to SR, etc.). Information may be passed on to other components of the communications device 1000. The antenna 1010 may correspond to a single antenna or a set of antennas. The transceiver 1008 may provide means for transmitting signals generated by other components of the communications device 1000.

Means for receiving or means for obtaining may include a receiver (such as the receive processor 338) or an antenna (s) 334 of the AP 110 or the receive processor 358 or antenna(s) 352 of the UE 120 illustrated in FIG. 3. Means for transmitting or means for outputting may include a transmitter (such as the transmit processor 320) or an antenna(s) 334 of the AP 110 or the transmit processor 364 or antenna (s) 352 of the UE 120 illustrated in FIG. 3.

Notably, FIG. 10 is just use one example, and many other examples and configurations of communications device 1000 are possible.

Figure 11:
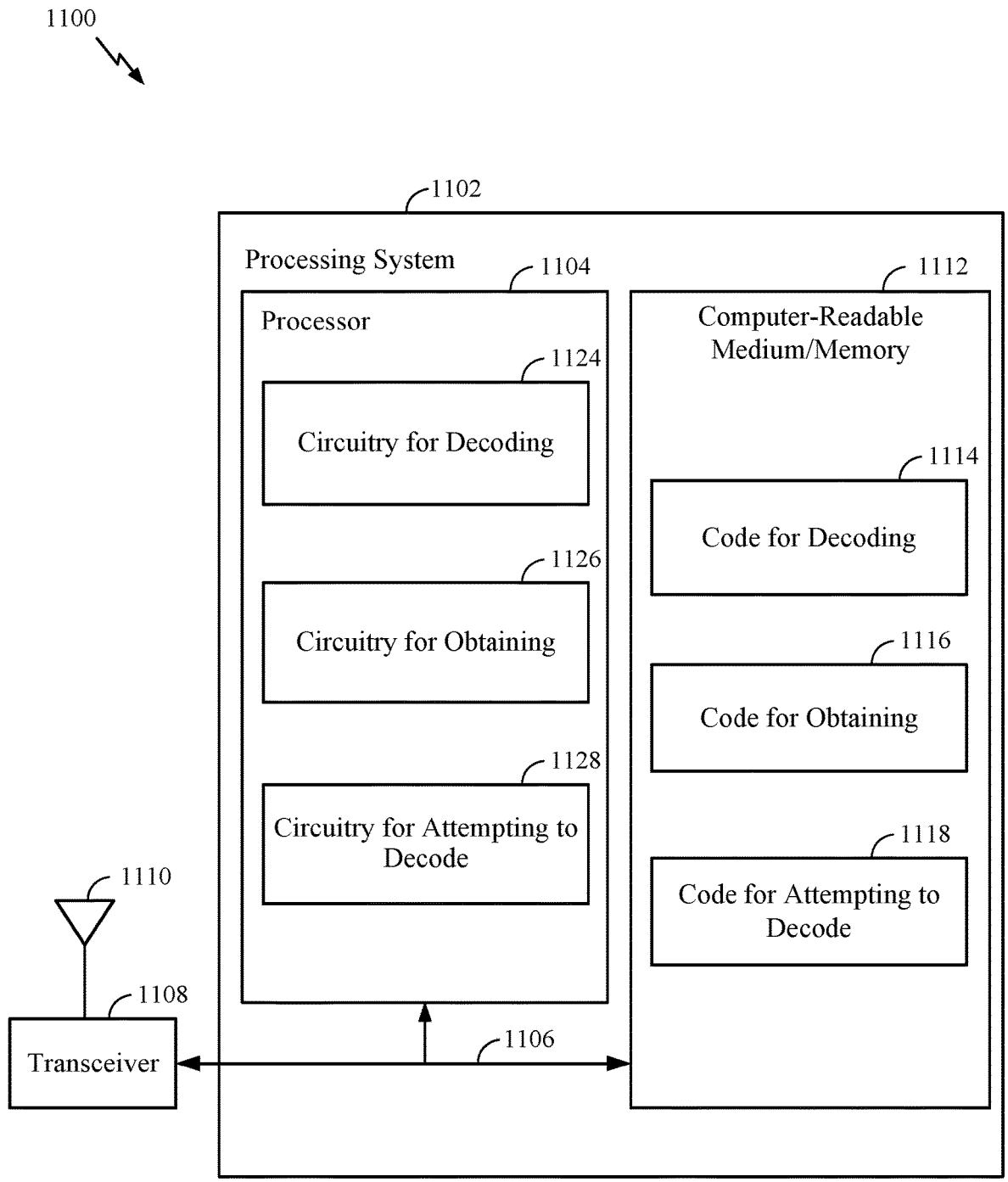
FIG. 11 illustrates a communications device that may include various components configured to perform the operations illustrated in FIG. 8, in accordance with certain aspects of the present disclosure.

FIG. 11 depicts an example communications device 1100 that includes various components operable, configured, or adapted to perform operations for the techniques disclosed herein, such as the operations depicted and described with respect to FIGS. 8 and 9. In some examples, communications device 1100 may be a UE or by a network entity (e.g., a BS/gNB) as described, for example with respect to FIGS. 1, 2, 3, and 6.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1104 coupled to a computer-readable medium/memory 1112 via a bus 1106. In certain aspects, computer-readable medium/memory 1112 is configured to store instructions (e.g., computer-executable code) that when executed by the one or more processors 1104, cause the one or more processors 1104 to perform the operations illustrated in FIGS. 8 and 9, or other operations for performing the various techniques discussed herein for relaying.

In certain aspects, computer-readable medium/memory 1112 stores code 1114 for decoding; code 1116 for obtaining; and code 1118 for attempting to decode.

In some cases, code 1114 for decoding may include code for decoding at least a first packet from a second node. In some cases, code 1116 for obtaining may include code for obtaining an indication that the first packet includes pre-decoded first information about a second packet. In some cases, code 1118 for attempting to decode may include code for attempting to decode the second packet based on the pre-decoded first information.

In certain aspects, the one or more processors 1104 include circuitry configured to implement the code stored in the computer-readable medium/memory 1112, including circuitry 1124 for decoding; circuitry 1126 for obtaining; and circuitry 1128 for attempting to decode.

In some cases, circuitry 1124 for decoding may include circuitry for decoding at least a first packet from a second node. In some cases, circuitry 1126 for obtaining may include circuitry for obtaining an indication that the first packet includes pre-decoded first information about a second packet. In some cases, circuitry 1128 for attempting to decode may include circuitry for attempting to decode the second packet based on the pre-decoded first information.

In some cases, the operations illustrated in FIG. 8, as well as other operations described herein, may be implemented by one or more means-plus-function components. For example, in some cases, such operations may be implemented by means for determining and means for providing.

In some cases, means for decoding, means for obtaining, and means for attempting to decode, includes a processing system, which may include one or more processors, such as the receive processor 358 (or receive processor 338), the transmit processor 364 (or transmit processor 320), the TX MIMO processor 366 (TX MIMO processor 330), and/or the controller/processor 380 (controller/processor 340) of the UE (e.g., repeater) 120 illustrated in FIG. 3 and/or the processing system 1102 of the communication device 1100 in FIG. 11.

In some cases, means for decoding, means for obtaining, and means for attempting to decode, includes a processing system, which may include one or more processors, such as the receive processor 338, the transmit processor 320, the TX MIMO processor 330, and/or the controller/processor 340 of the access point (AP) 110 illustrated in FIG. 3 and/or the processing system 1102 of the communication device 1100 in FIG. 11.

The transceiver 1108 may provide a means for receiving or transmitting information such as packets, user data, or control information associated with various information channels (e.g., control channels, data channels, and information related to SR, etc.). Information may be passed on to other components of the communications device 1100. The antenna 1110 may correspond to a single antenna or a set of antennas. The transceiver 1108 may provide means for transmitting signals generated by other components of the communications device 1100.

Means for receiving or means for obtaining may include a receiver (such as the receive processor 338) or an antenna (s) 334 of the AP 110 or the receive processor 358 or antenna(s) 352 of the UE 120 illustrated in FIG. 3. Means for transmitting or means for outputting may include a transmitter (such as the transmit processor 320) or an antenna(s) 334 of the AP 110 or the transmit processor 364 or antenna (s) 352 of the UE 120 illustrated in FIG. 3.

Notably, FIG. 11 is just use one example, and many other examples and configurations of communications device 1100 are possible.

EXAMPLE CLAUSES

Implementation examples are described in the following numbered clauses:

Clause 1. A method for wireless communications by a first node, comprising: determining at least one first packet to be transmitted to a second node includes pre-decoded first information about a second packet; and providing an indication to the second node that the first packet includes pre-decoded first information.

Clause 2. The method of clause 1, wherein: the first packet is transmitted to the second node by a relay node; and the second packet comprises a source packet from a transmitter node.

Clause 3. The method of clause 1 or 2, further comprising providing a configuration for packets including pre-decoded information via radio resource control (RRC) signaling.

Clause 4. The method of clause 3, wherein the configuration indicates at least one of a number of bits per pre-decoded sample.

Clause 5. The method of clause 3 or 4, wherein the first node is a transmitter node and the indication is provided via the configuration.

Clause 6. The method of any of clauses 1-5, wherein the first packet also indicates second information to assist decoding the second packet.

Clause 7. The method of clause 6, wherein the second information indicates formatting information for the pre-decoded first information.

Clause 8. The method of clause 7, where the formatting information includes at least one of a bit width or compression scheme for the pre-decoded first information.

Clause 9. The method of clause 7 or 8, wherein the first node is a relay node and wherein: the pre-decoded first information comprises logarithmic-likelihood ratios (LLRs); and the formatting information includes a number of decoder-iterations after which the LLRs were generated.

Clause 10. The method of any of clauses 6-9, wherein: the first packet is transmitted to the second node via a transmitter node; and the second information indicates a subset of information provided explicitly or implicitly to the transmitter node.

Clause 11. The method of clause 10, where the subset of information depends on a formatting of the pre-decoded first information.

Clause 12. The method of clause 10 or 11, wherein the subset of information includes at least one of: a transport block size (TBS), a channel coding scheme, a low density parity check (LDPC) base graph index, a time domain allocation, a frequency domain allocation, a demodulation reference signal (DMRS) configuration, or a rate-matching configuration.

Clause 13. The method of any of clauses 6-12, wherein: a subset of the second information is derived from third information indicated for the second packet that also contains pre-decoded information about the second packet.

Clause 14. The method of any of clauses 1-13, wherein the indication indicates whether the first packet includes a combination of pre-decoded and decoded information.

Clause 15. A method for wireless communications by a first node, comprising: decoding at least a first packet from a second node; obtaining an indication that the first packet includes pre-decoded first information about a second packet; and attempting to decode the second packet based on the pre-decoded first information.

Clause 16. The method of clause 15, wherein: the first packet is received from a relay node; and second packet comprises a source packet from a transmitter node, received by the relay node.

Clause 17. The method of clause 15 or 16, comprising receiving a configuration for packets including pre-decoded information via radio resource control (RRC) signaling.

Clause 18. The method of clause 17, wherein the configuration indicates at least one of a number of bits per pre-decoded sample.

Clause 19. The method of clause 17 or 18, wherein the first node is a receiver node, the indication is obtained by the receiver node from a transmitter node via the configuration, and the first packet is received by the receiver node from a relay node.

Clause 20. The method of any of clauses 15-19, wherein: the first packet also indicates second information; and the first node uses the second information to assist decoding the second packet.

Clause 21. The method of clause 20, wherein the second information indicates formatting information for the pre-decoded first information.

Clause 22. The method of clause 21, where the formatting information includes at least one of a bit width or compression scheme for the pre-decoded first information.

Clause 23. The method of clause 21 or 22, wherein: the pre-decoded first information comprises logarithmic likelihood-ratios (LLRs); and the formatting information includes a number of decoder-iterations after which the LLRs were generated.

Clause 24. The method of any of clauses 20-23, wherein: the second information indicates a subset of information provided explicitly or implicitly to the second node.

Clause 25. The method of clause 24, where the subset of information depends on a formatting of the pre-decoded first information.

Clause 26. The method of clause 24 or 25, wherein the subset of information includes at least one of: a transport block size (TBS), a channel coding scheme, a low density parity check (LDPC) base graph index, a time domain allocation, a frequency domain allocation, a demodulation reference signal (DMRS) configuration, or a rate-matching configuration.

Clause 27. The method of any of clauses 20-26, wherein: a subset of the second information is derived from third information indicated for the second packet that also contains pre-decoded information about the second packet.

Clause 28. The method of any of clauses 15-27, wherein the indication indicates whether the first packet includes a combination of pre-decoded and decoded information.

Clause 29. An apparatus, comprising: at least one processor; a memory coupled to the at least one processor, the memory including instructions executable by the at least one processor to cause the apparatus to perform a method based, at least in part, on any one of Clauses 1-28.

Clause 30. An apparatus, comprising means for performing a method based, at least in part, on any one of Clauses 1-28.

Clause 31. A non-transitory computer-readable medium comprising executable instructions that, when executed by one or more processors of an apparatus, cause the apparatus to perform a method based, at least in part, on any one of Clauses 1-28.

Example Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Means for associating, means for determining, means for monitoring, means for deciding, means for providing, means for detecting, means for performing, and/or means for setting may include a processing system, which may include one or more processors, such as the receive processor 338/358, the transmit processor 320/364, the TX MIMO processor 330/366, or the controller 340/380 of the AP 110 and UE 120 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a UE and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a UE and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first node, comprising:
generating a relay packet without decoding a source packet, wherein:
the relay packet includes pre-decoded samples of the source packet and information to assist decoding the pre-decoded samples of the source packet;
the pre-decoded samples of the source packet comprise logarithmic-likelihood ratios (LLRs);
providing an indication to a second node that the relay packet includes the pre-decoded samples of the source packet; and
transmitting the relay packet to the second node.

2. The method of claim 1, wherein:
the first node is a relay node; and
the source packet comprises a source packet from a transmitter node.

3. The method of claim 1, further comprising providing a configuration for packets including pre-decoded samples via radio resource control (RRC) signaling.

4. The method of claim 3, wherein the configuration indicates at least one of a number of bits per pre-decoded sample.

5. The method of claim 3, wherein:
the first node is a transmitter node; and
the indication is provided via the configuration.

6. The method of claim 1, wherein the indication indicates formatting information for the pre-decoded samples of the source packet.

7. The method of claim 6, where the formatting information includes at least one of a bit width or compression scheme for the pre-decoded samples of the source packet.

8. The method of claim 6, wherein the first node is a relay node and wherein:
the formatting information includes a number of decoder-iterations after which the LLRs were generated.

9. The method of claim 1, wherein:
the relay packet is transmitted to the second node via a transmitter node; and
the indication indicates a subset of information provided explicitly or implicitly to the transmitter node.

10. The method of claim 9, wherein the subset of information depends on a formatting of the pre-decoded samples of the source packet.

11. The method of claim 9, wherein the subset of information includes at least one of: a transport block size (TBS), a channel coding scheme, a low density parity check (LDPC) base graph index, a time domain allocation, a frequency domain allocation, a demodulation reference signal (DMRS) configuration, or a rate-matching configuration.

12. The method of claim 1, wherein:
a subset of information indicated in the indication is derived from second information indicated for the source packet that also contains pre-decoded information about the source packet.

13. The method of claim 1, wherein the indication indicates whether the relay packet includes a combination of pre-decoded and decoded samples.

14. A method for wireless communications by a second node, comprising:
obtaining and decoding at least a relay packet, from a first node, without decoding of a source packet, wherein:
the relay packet includes pre-decoded samples of the source packet and information to assist decoding the pre-decoded samples of the source packet;
the pre-decoded samples of the source packet comprising logarithmic-likelihood ratios (LLRs);
obtaining an indication that the relay packet includes the pre-decoded samples of the source packet; and
attempting to decode the source packet based on the pre-decoded samples of the source packet and using the indicated information.

15. The method of claim 14, wherein:
the first node is a relay node; and
source packet comprises a source packet from a transmitter node, received by the relay node.

16. The method of claim 14, comprising receiving a configuration for packets including pre-decoded samples via radio resource control (RRC) signaling.

17. The method of claim 16, wherein the configuration indicates at least one of a number of bits per pre-decoded sample.

18. The method of claim 16, wherein:
the second node is a receiver node;
the indication is obtained by the receiver node from a transmitter node via the configuration; and
the first node is a relay node.

19. The method of claim 14, wherein the information indicates formatting information for the pre-decoded samples of the source packet.

20. The method of claim 19, where the formatting information includes at least one of a bit width or compression scheme for the pre-decoded samples of the source packet.

21. The method of claim 19, wherein:
the formatting information includes a number of decoder-iterations after which the LLRs were generated.

22. The method of claim 14, wherein:
the indication indicates a subset of information provided explicitly or implicitly to the first node.

23. The method of claim 22, wherein the subset of information depends on a formatting of the pre-decoded samples of the source packet.

24. The method of claim 22, wherein the subset of information includes at least one of: a transport block size (TBS), a channel coding scheme, a low density parity check (LDPC) base graph index, a time domain allocation, a frequency domain allocation, a demodulation reference signal (DMRS) configuration, or a rate-matching configuration.

25. The method of claim 14, wherein:
a subset of information indicated in the indication is derived from second information indicated for the source packet that also contains pre-decoded information about the source packet.

26. The method of claim 14, wherein the indication indicates whether the relay packet includes a combination of pre-decoded and decoded samples.

27. A processing system for wireless communications by a first node, comprising:
one or more processors individually or collectively configured to execute instructions stored on one or more memories and to cause the first node to:
generate a relay packet, wherein:
the relay packet includes pre-decoded samples of a source packet and information to assist decoding the pre-decoded samples of the source packet;
the pre-decoded samples of the source packet comprise logarithmic-likelihood ratios (LLRs); and
the one or more processors are configured to cause the first node to generate the relay packet, including the pre-decoded samples of the source packet, without decoding of the source packet;

provide an indication to a second node that the relay packet includes the pre-decoded samples of the source packet; and transmit the relay packet to the second node.

28. A processing system for wireless communications by a second node, comprising:

one or more processors individually or collectively configured to execute instructions stored on one or more memories and to cause the second node to:

decode at least a relay packet, from a first node, wherein:

the relay packet includes pre-decoded samples of a source packet and information to assist decoding the pre-decoded samples of the source packet the pre-decoded samples of the source packet comprising logarithmic-likelihood ratios (LLRs); and the one or more processors are configured to cause the second node to obtain the relay packet, including the pre-decoded samples of the source packet, without decoding of the source packet;

obtain an indication that the relay packet includes the pre-decoded samples of the source packet; and attempt to decode the source packet based on the pre-decoded samples of the source packet and using the indicated information.

\* \* \* \* \*